United States Patent
Oh et al.

(10) Patent No.: US 9,870,086 B2
(45) Date of Patent: Jan. 16, 2018

(54) ELECTRONIC DEVICE AND METHOD FOR UNLOCKING IN THE ELECTRONIC DEVICE

(71) Applicant: Samsung Electronics Co., Ltd., Gyeonggi-do (KR)

(72) Inventors: Ji-Woong Oh, Gyeongsangbuk-do (KR); Gyu-Cheol Choi, Gyeongsangbuk-do (KR)

(73) Assignee: Samsung Electronics Co., Ltd. (KR)

( * ) Notice: Subject to any disclaimer, the term of this patent is extended or adjusted under 35 U.S.C. 154(b) by 258 days.

(21) Appl. No.: 14/209,092

(22) Filed: Mar. 13, 2014

(65) Prior Publication Data
US 2014/0313307 A1    Oct. 23, 2014

(30) Foreign Application Priority Data

Apr. 18, 2013    (KR) .......................... 10-2013-0042745

(51) Int. Cl.
| | |
|---|---|
| *G06K 9/00* | (2006.01) |
| *G06F 3/041* | (2006.01) |
| *H04N 7/18* | (2006.01) |
| *H04M 1/67* | (2006.01) |
| *G07C 9/00* | (2006.01) |
| *G06F 3/01* | (2006.01) |
| *G06F 3/0488* | (2013.01) |

(52) U.S. Cl.
CPC ............ *G06F 3/0416* (2013.01); *G06F 3/012* (2013.01); *G06F 3/013* (2013.01); *G06F 3/04883* (2013.01); *G07C 9/00087* (2013.01); *H04M 1/67* (2013.01); *G06F 2203/0381* (2013.01); *H04M 2250/22* (2013.01); *H04M 2250/52* (2013.01)

(58) Field of Classification Search
None
See application file for complete search history.

(56) References Cited

U.S. PATENT DOCUMENTS

| | | | |
|---|---|---|---|
| 7,971,214 B1 * | 6/2011 | Gakumura | G06F 21/88 |
| | | | 725/25 |
| 8,411,909 B1 * | 4/2013 | Zhao | G06K 9/00248 |
| | | | 382/116 |
| 2011/0254865 A1 * | 10/2011 | Yee | G06F 3/013 |
| | | | 345/661 |

(Continued)

FOREIGN PATENT DOCUMENTS

| | | |
|---|---|---|
| KR | 20120019637 | 3/2012 |
| KR | 1020120067445 | 6/2012 |
| KR | 1020120079379 | 7/2012 |

*Primary Examiner* — Kate Luo
(74) *Attorney, Agent, or Firm* — The Farrell Law Firm, P.C.

(57) ABSTRACT

An electronic device and an unlocking method in the electronic device are provided. The electronic device includes a display unit configured to display at least one function icon on a lock screen, at least one camera, and a controller configured to recognize a face based on data received from the at least one camera in response to a request for unlocking, to select a function icon to be executed from among the at least one function icon, to perform unlocking based on the facial recognition, and to execute, simultaneously with the unlocking, a function corresponding to the selected function icon.

9 Claims, 7 Drawing Sheets

(56) References Cited

U.S. PATENT DOCUMENTS

| | | | |
|---|---|---|---|
| 2012/0027267 A1* | 2/2012 | Kim | G06F 3/0418 |
| | | | 382/118 |
| 2012/0154301 A1 | 6/2012 | Kang et al. | |
| 2012/0229373 A1* | 9/2012 | Kogane | G09G 5/36 |
| | | | 345/156 |
| 2013/0024047 A1* | 1/2013 | Kalhous | G06F 3/013 |
| | | | 701/1 |
| 2013/0035141 A1* | 2/2013 | Murakami | G06F 3/0488 |
| | | | 455/566 |
| 2013/0298024 A1 | 11/2013 | Rhee et al. | |

* cited by examiner

ELECTRONIC DEVICE AND METHOD FOR UNLOCKING IN THE ELECTRONIC DEVICE

PRIORITY

This application claims priority under 35 U.S.C. §119(a) to Korean Application Serial No. 10-2013-0042745, which was filed in the Korean Intellectual Property Office on Apr. 18, 2013, the entire content of which is incorporated herein by reference.

BACKGROUND OF THE INVENTION

1. Field of the Invention

The present invention generally relates to an electronic device and an unlocking method in an electronic device.

2. Description of the Related Art

Recently, as communication technologies have rapidly developed, functions of electronic devices have increased. Accordingly, an increasing number of user interfaces (UIs) and various functions using the same have been developed.

The electronic device is equipped with a lock function that may be embodied in various ways, so as to restrict an unnecessary input error during an idle state or to restrict the use of other users. In general, an electronic device performs a lock function when activation of the lock function is selected by a user. The user, for example, may set the lock function using a secret code such as a predetermined pattern, a password, and the like, so as to prevent other users from using a user's electronic device.

The electronic device activates the lock function, enters into a lock mode, displays a lock screen on the electronic device in the lock mode, and deactivates various functions when the lock function is set as described above, when a lock condition is satisfied (e.g., when no input is input by the user during a predetermined period of time) or when an input is not input during a predetermined period of time during which the user has used a predetermined function of the electronic device.

However, the electronic device does not allow selection of various functions or applications in the lock mode. The user is required to cancel the lock mode (i.e., unlock the device) and to select a function or an application, so as to execute the function or the application of the electronic device. For example, to execute a desired function or application in a state where a lock mode is set, the electronic device must be unlocked, to display various functions or applications, and must receive an input of a desired function or application from the user, so as to execute the selected function or application. This process is time-consuming and inconvenient.

SUMMARY OF THE INVENTION

The present invention has been made to address at least the problems and disadvantages described above, and to provide at least the advantages described below. Accordingly, aspects of the present invention provide an electronic device and an unlocking method in the electronic device which simultaneously and promptly requests execution of a desired function or application before a user cancels a lock mode, and executes the function or application requested by the user at the same time as canceling the lock mode.

Another aspect of the present invention is to provide an electronic device and an unlocking method in the electronic device which more promptly performs unlocking and executes a function or application by simultaneously performing unlocking through facial recognition and execution of the function or application through touch input or gaze recognition.

In accordance with an aspect of the present invention, an electronic device is provided. The electronic device includes a display unit configured to display at least one function icon on a lock screen; at least one camera; and a controller configured to recognize a face based on data received from the at least one camera in response to a request for unlocking, to select a function icon from among the at least one function icon to be executed, to perform unlocking based on the facial recognition, and to execute a function corresponding to the selected function icon at the same time as the unlocking.

In accordance with another aspect of the present invention, a method of unlocking an electronic device is provided. The method includes displaying at least one function icon on a lock screen; recognizing a face based on data received from at least one camera in response to a request for unlocking; selecting a function icon from among the at least one function icon to be executed; performing unlocking based on the facial recognition, and executing a function corresponding to the selected function icon at the same time as the unlocking.

In accordance with another aspect of the present invention, a storage medium that stores an unlocking program is provided, wherein the program in an electronic device performs a method including the steps of displaying at least one function icon on a lock screen; recognizing a face based on data received from at least one camera in response to a request for unlocking; selecting a function icon from among the at least one function icon to be executed; performing unlocking based on the facial recognition, and executing a function corresponding to the selected function icon at the same time as the unlocking.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

Figure 1:
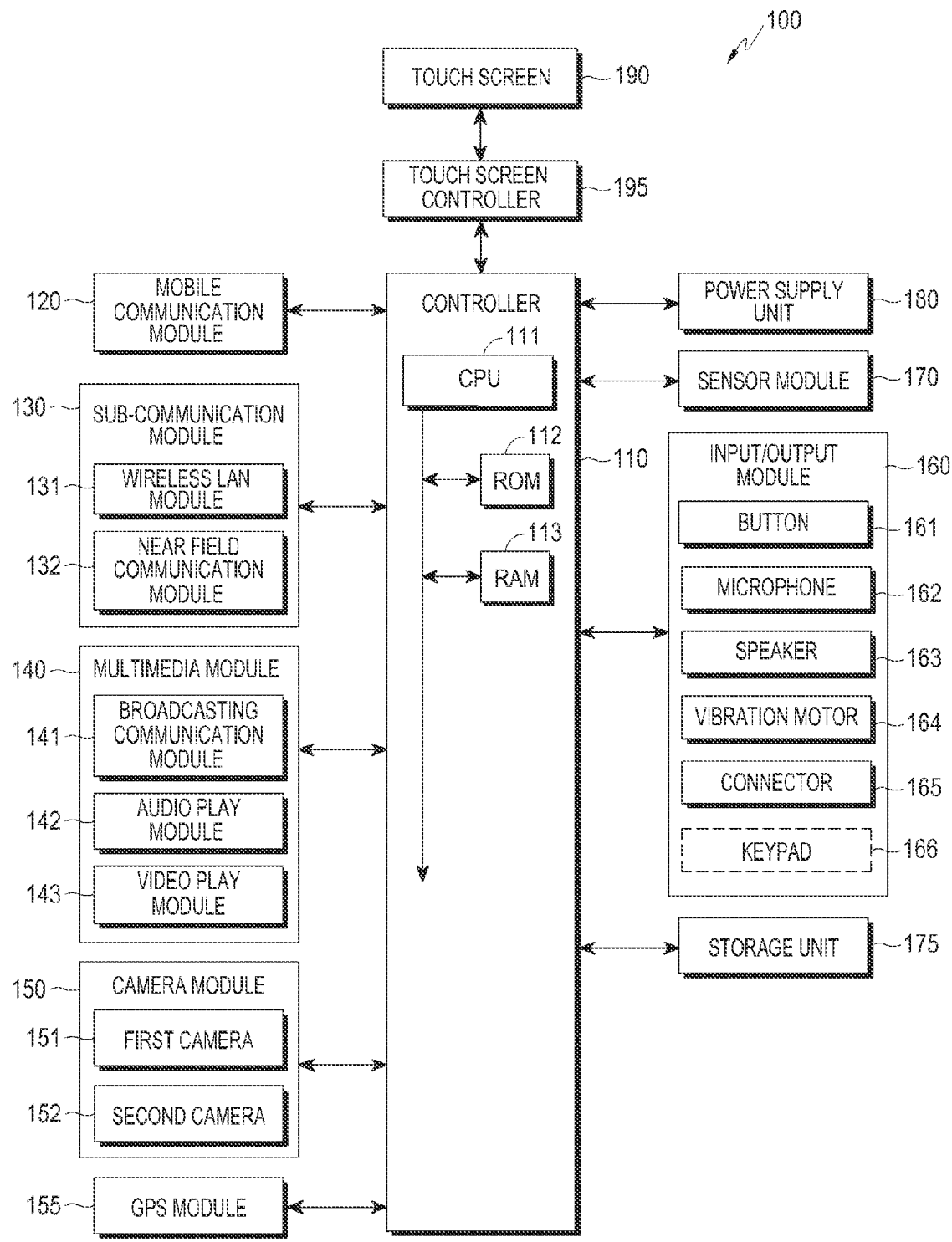
FIG. 1 is a block diagram illustrating an electronic device according to embodiments of the present invention.

Hereinafter, embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention unclear.

According to embodiments of the present invention, unlocking and execution of a function or an application may be promptly performed by simultaneously performing unlocking through facial recognition and execution of a function or an application through touch inputting or gaze recognition while a lock mode is set.

The embodiments of the present invention may be applicable to any device that is capable of performing a lock function and displays a lock screen. For example, the device may include electronic devices such as a portable phone, a smart phone, a tablet PC, and the like, and a stationary terminal such as a PC, a monitor, and the like.

The embodiments of the present invention will be described with respect to an electronic device.

FIG. 1 is a block diagram illustrating an electronic device according to embodiments of the present invention. Referring to FIG. 1, an electronic device 100 may be connected to an external device (not illustrated) using a mobile communication module 120, a sub-communication module 130, and/or a connector 165. The external device may include a different device (not illustrated), a portable phone (not illustrated), a smart phone (not illustrated), a tablet PC (not illustrated), and/or a server (not illustrated).

Referring to FIG. 1, the device 100 includes a touch screen 190 and a touch screen controller 195. Also, the device 100 includes a controller 110, the mobile communication module 120, the sub-communication module 130, a multimedia module 140, a camera module 150, a GPS module 155, an input/output module 160, a sensor module 170, a storage unit 175, and a power supply unit 180. The sub-communication module 130 includes at least one of a wireless LAN module 131 and a Near Field Communication module (NFC) 132. The multimedia module 140 includes at least one of a broadcasting communication module 141, an audio play module 142, and a video play module 143. The camera module 150 includes at least one of a first camera 151 and a second camera 152. The input/output module 160 includes at least one of a button 161, a microphone 162, a speaker 163, a vibration motor 164, a connector 165, and a key pad 166.

The controller 110 may include a CPU 111, a ROM 112 that stores a control program for controlling the device 100, and a RAM 113 that stores a signal or data input from the outside of the device 100 or is used as a memory region for an operation performed in the device 100. The CPU 111 may include a single-core, a dual-core, a triple-core, or a quad-core processor. The CPU 111, the ROM 112, and the RAM 113 may be mutually connected through an internal bus.

The controller 110 may control the mobile communication module 120, the sub-communication module 130, the multimedia module 140, the camera module 150, the GPS module 155, the input/output module 160, the sensor module 170, the storage unit 175, the power supply unit 180, the touch screen 190, and the touch screen controller 195. That is, the controller 110 performs a general control function associated with the electronic device 100, and controls a signal flow between the components.

Particularly, the controller 110 is configured to display at least one icon corresponding to a predetermined function or a predetermined application on a lock screen while a lock mode is set. Also, when a request for unlocking is made through an inputting scheme such as, for example, pressing on a predetermined unlock request button by a user, the controller 110 recognizes a face of the user using at least one of the first camera 151 and the second camera 152 so as to determine whether to perform unlocking, and selects a function or application icon from among the at least one icon to be executed at the same time as unlocking based on a user gesture input. When facial recognition succeeds, the controller 110 may execute a function or an application corresponding to the selected icon at the same time as the unlocking.

The mobile communication module 120 connects the device 100 to an external device through mobile communication, using at least one antenna based on a control of the controller 110. The mobile communication module 120 transmits and receives a wireless signal for a voice call, a video call, a short message service (SMS), and/or a multimedia message service (MMS), with a portable phone (not illustrated) having a phone number corresponding to a number input into the device 100 which may include, for example, a smart phone (not illustrated), a tablet PC (not illustrated), or other devices (not illustrated).

The sub-communication module 130 may include at least one of the wireless LAN module 131 and the NFC 132. For example, the sub-communication module 130 may include only the wireless LAN module 131, only the NFC 132, or both the wireless LAN module 131 and the NFC 132.

The wireless LAN module 131 may be connected to the Internet in an area where a wireless access point (AP) (not illustrated) is installed, based on a control of the controller 110. The wireless LAN module 131 supports wireless LAN standards (IEEE802.11x) of the Institute of Electrical and Electronic Engineers (IEEE). The NFC 132 may wirelessly perform near field communication between the device 100 and an image forming device (not illustrated) based on a control of the controller 110. The near field communication scheme may include, for example, Bluetooth, Infrared Data Association (IrDA), and the like.

The electronic device 100 may include at least one of the mobile communication module 120, the wireless LAN module 131, and the NFC 132, depending on requirements of the device 100. For example, depending on the requirements, the device 100 may include a combination of the mobile communication module 120, the wireless LAN module 131, and the NFC 132.

The multimedia module 140 may include the broadcasting communication module 141, the audio play module 142, and/or the video play module 143. The broadcasting communication module 141 may receive a broadcasting signal (for example, a TV broadcasting signal, a radio broadcasting signal, and/or a data broadcasting signal) and broadcasting subsidiary information (for example, EPS (Electric Program Guide) or ESG (Electric Service Guide)) transmitted from a broadcasting station, through a broadcasting communication antenna (not illustrated), based on a control of the controller 110. The audio play module 142 may play back a stored or received digital audio file (e.g., audio file with file extension mp3, wma, ogg, or way) based on a control of the controller 110. The video play module 143 may play back a stored or received digital video file (e.g., video file with file extension mpeg, mpg, mp4, avi, mov, or mkv) based on a control of the controller 110. The video play module 143 may also play back a digital audio file.

The multimedia module 140 may include the audio play module 142 and the video play module 143, excluding the broadcasting communication module 141. Also, the audio play module 142 or the video play module 143 of the multimedia module 140 may instead be included in the controller 110.

The camera module 150 may include at least one of the first camera 151 and the second camera 152 that are configured to capture a still image and/or a video based on a control of the controller 110. Also, the first camera 151 and/or the second camera 152 may include a secondary light source (for example, a flash (not illustrated)) that provides an amount of light required for capturing an image. The first camera 151 may be disposed on a front side of the device 100, and the second camera 152 may be disposed on a back side of the device 100. Alternatively, the first camera 151 and the second camera 152 may be disposed close to each other (for example, a distance between the first camera 151 and the second camera 152 is greater than 1 cm and less than 8 cm) and thus, a three-dimensional (3D) still image or a 3D video may be captured.

The GPS module 155 may receive an electric wave from a plurality of GPS satellites (not illustrated) in the Earth's orbit, and may calculate a location of the device 100 based on a Time of Arrival (TOA) from a GPS satellite (not illustrate) to the device 100.

The input/output module 160 may include at least one button 161, the microphone 162, the speaker 163, the vibration motor 164, the connector 165, and the keypad 166.

The button 161 may be formed on a front side, a lateral side, or a back side of a housing of the device 100, and may include at least one of a power button (not illustrated), a lock button (not illustrated), a volume button (not illustrated), a menu button, a home button, a back button, and a search button.

The microphone 162 receives an input of a voice or a sound, and generates an electric signal, based on a control of the controller 110.

The speaker 163 may output, to the outside of the device 100, a sound corresponding to various signals (for example, a wireless signal, a broadcasting signal, a digital audio file, a digital video file, an image capturing signal, and the like) of the mobile communication module 120, the sub-communication module 130, the multimedia module 140, or the camera module 150, based on a control of the controller 110. The speaker 163 may output a sound (for example, a button manipulation sound corresponding to a phone call or a ring-back tone) corresponding to a function performed by the device 100. One or more speakers 163 may be formed on an appropriate location or locations of the housing of the device 100.

The vibration motor 164 may convert an electric signal into a mechanical vibration based on a control of the controller 110. For example, when the device 100, in a vibration mode, receives a voice call from another device (not illustrated), the vibration motor 164 may operate. One or more vibration motors 164 may be formed in the housing of the device 100. The vibration motor 164 may also operate in response to detection of a touch motion of a user who touches the touch screen 190 or successive motions of a touch on the touch screen 190.

The connector 165 may be used as an interface for connecting the device 100 and an external device (not illustrated) or a power source (not illustrated). Based on a control of the controller 110, data stored in the storage unit 175 of the device 100 may be transmitted to an external device (not illustrated) or data may be received from an external device (not illustrated) through a wired cable connected to the connector 165. Power may be input from a power source (not illustrated) or a battery (not illustrated) may be charged through the wired cable connected to the connector 165.

The keypad 166 may receive a key input from the user for controlling the device 100. The keypad 166 may include a physical keypad (not illustrated) formed on the device 100 and/or a virtual keypad (not illustrated) displayed on the touch screen 190. The physical keypad (not illustrated) formed on the device 100 may be excluded depending on the performance or a configuration of the device 100.

The sensor module 170 includes at least one sensor configured to detect a state of the device 100. For example, the sensor module 170 may include a proximity sensor configured to detect a proximity of the user to the device 100, an illuminance sensor configured to detect an amount of light around the device 100, or a motion sensor (not illustrated) configured to detect a motion of the device 100 (for example, a rotation of the device 100 and an acceleration or vibration applied to the device 100). The at least one sensor may detect the state, and may generate a signal corresponding to the detected state so as to transmit the generated signal to the controller 110. A sensor may be added to or removed from the sensor module 170 depending on the desired performance of the device 100.

The storage unit 175 may store a signal or data input/output in association with an operation of the mobile communication module 120, the sub-communication module 130, the multimedia module 140, the camera module 150, the GPS module 155, the input/output module 160, the sensor module 170, the touch screen 190, based on a control of the controller 110. The storage unit 175 may store a control program and application for controlling the device 100 or the controller 110.

Particularly, the storage unit 175 may include various setting information associated with the use of a user interface provided from the device 100 and the use of the device 100, and information associated with setting of a lock mode, according to an embodiment of the present invention. The information associated with setting of the lock mode includes at least one locking scheme, a plurality of unlock screens associated with the at least one locking scheme, unlocking information, and the like.

The term "storage unit" includes the storage unit 175, the ROM 112 and the RAM 113 included in the controller 110, or a memory card (not illustrated) (for example, an SD card or a memory stick) contained in the device 100. The storage unit may include, for example, a non-volatile memory, a volatile memory, a Hard Disk Drive (HDD), or a Solid State Drive (SSD).

The power supply unit 180 may supply power to one or more batteries (not illustrated) disposed in the housing of the device 100, based on a control of the controller 110. The one or more batteries (not illustrated) may provide power to the device 100. Alternatively, the power supply unit 180 may supply, to the device 100, power input from an external power source (not illustrated) through the wired cable connected to the connector 165.

The touch screen 190 may provide a user with user interfaces corresponding to various functionalities (for example, calling, data transmission, broadcasting, and image capturing). The touch screen 190 may transmit, to the touch screen controller 195, an analog signal corresponding to at least one touch input to a user interface. The touch screen 190 may receive an input of at least one touch through a body part of the user (for example, a finger, including a thumb) or a touch device (for example, a stylus pen). Also, the touch screen 190 may receive an input of successive motions of one touch from among the at least one touch. The touch screen 190 may transmit, to the touch screen controller 195, an analog signal corresponding to the successive motions of the input touch.

Particularly, according to an embodiment of the present invention, the touch screen 190 may display a lock screen and at least one icon corresponding to a predetermined function or application on the lock screen, based on a control of the controller 110. In this scenario, the touch screen 190 may display at least one different lock screen depending on a lock mode. The touch screen 190 may transmit an unlocking input event to the controller 110 based on a control of the controller 110, when an input corresponding to unlocking is received from the user while the lock screen is displayed. In this scenario, the unlocking input from the user may be a predetermined user gesture input. The user gesture input may include a touch and drag input for inputting a pattern, a touch input for inputting a predetermined password value, and the like.

In the present invention, the touch is not limited to a contact between the touch screen 190 and a body part of the user or a touch device, and may include, for example, a non-contact input (for example, the case in which a detectable distance between the touch screen 190 and the body part of the user or the touch device is less than or equal to 1 mm) The detectable distance that may be detected by the touch screen 190 may be changed based on the performance or a configuration of the device 100. The touch screen 190 may be embodied based on varied schemes such as, for example, a resistive scheme, a capacitive scheme, an infrared scheme, an Electronic Magnetic Resonance (EMR) scheme, an acoustic wave scheme, and the like or a combination thereof.

The touch screen controller 195 converts an analog signal, received from the touch screen 190, into a digital signal (for example, X and Y coordinates), and transmits the converted digital signal to the controller 110. The controller 110 may control the touch screen 190 based on the digital signal received from the controller 195. For example, the controller 110 may select a shortcut icon (not illustrated) displayed on the touch screen 190 or execute the shortcut icon (not illustrated), in response to a touch. Also, the touch screen controller 195 may be included in the controller 110.

Additionally, the controller 110 may detect various user inputs received through the camera module 150, the input/output module 160, the sensor module 170, and the like, in addition to the touch screen 190. The user input may include various forms of information that are input into the device 100, such as, for example, a gesture of the user, a voice, a movement of an eye, a bio-signal, and the like. The controller 110 may control the device 100 so that a predetermined motion or function corresponding to the detected user input is executed in the device 100.

Hereinafter, an unlocking method in a state in which a lock mode is set for the electronic device 100 will be described according to embodiments of the present invention.

Figure 2:
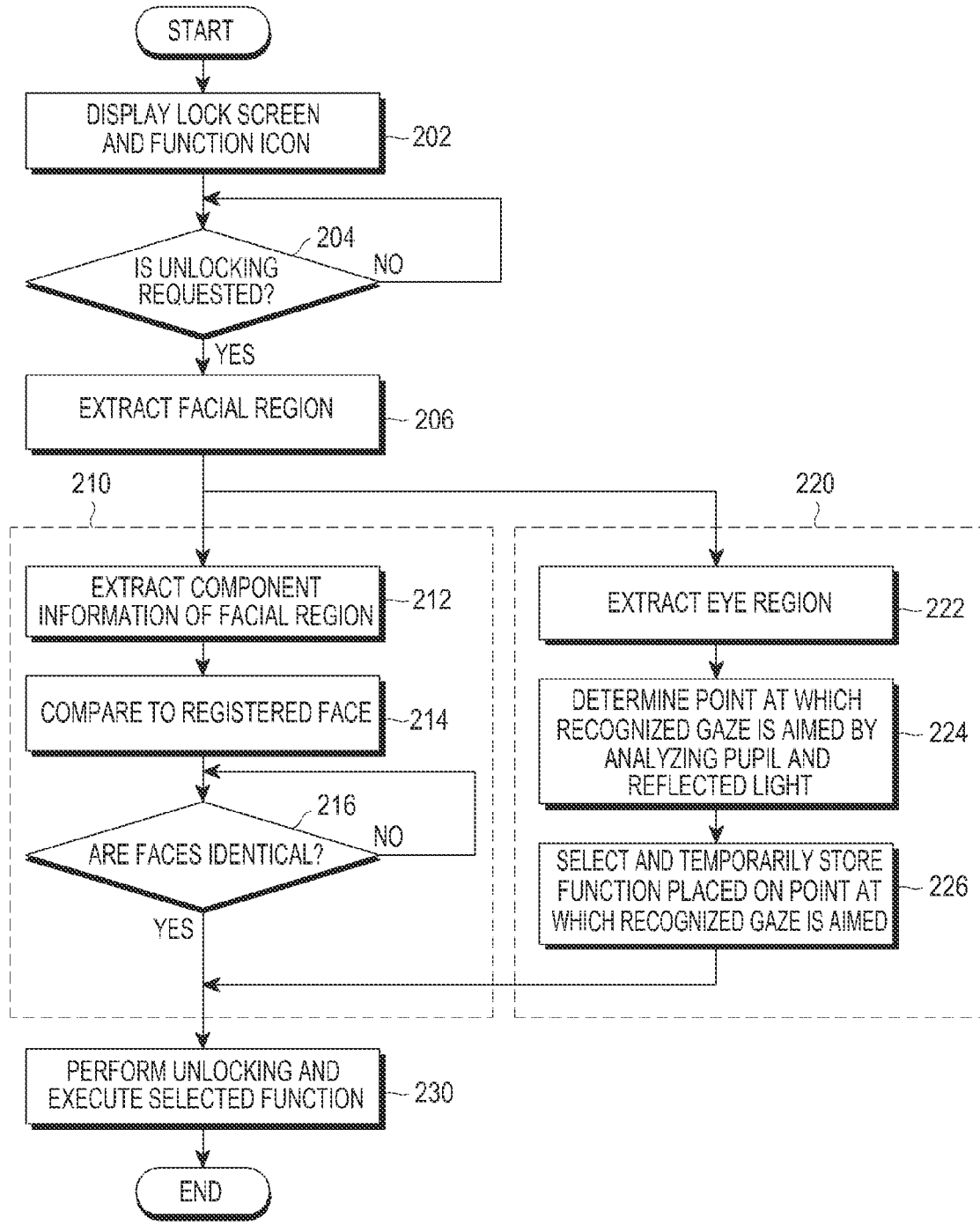
FIG. 2 is a flowchart illustrating an unlocking operation in an electronic device according to an embodiment of the present invention.
Figures 3A, 3B:
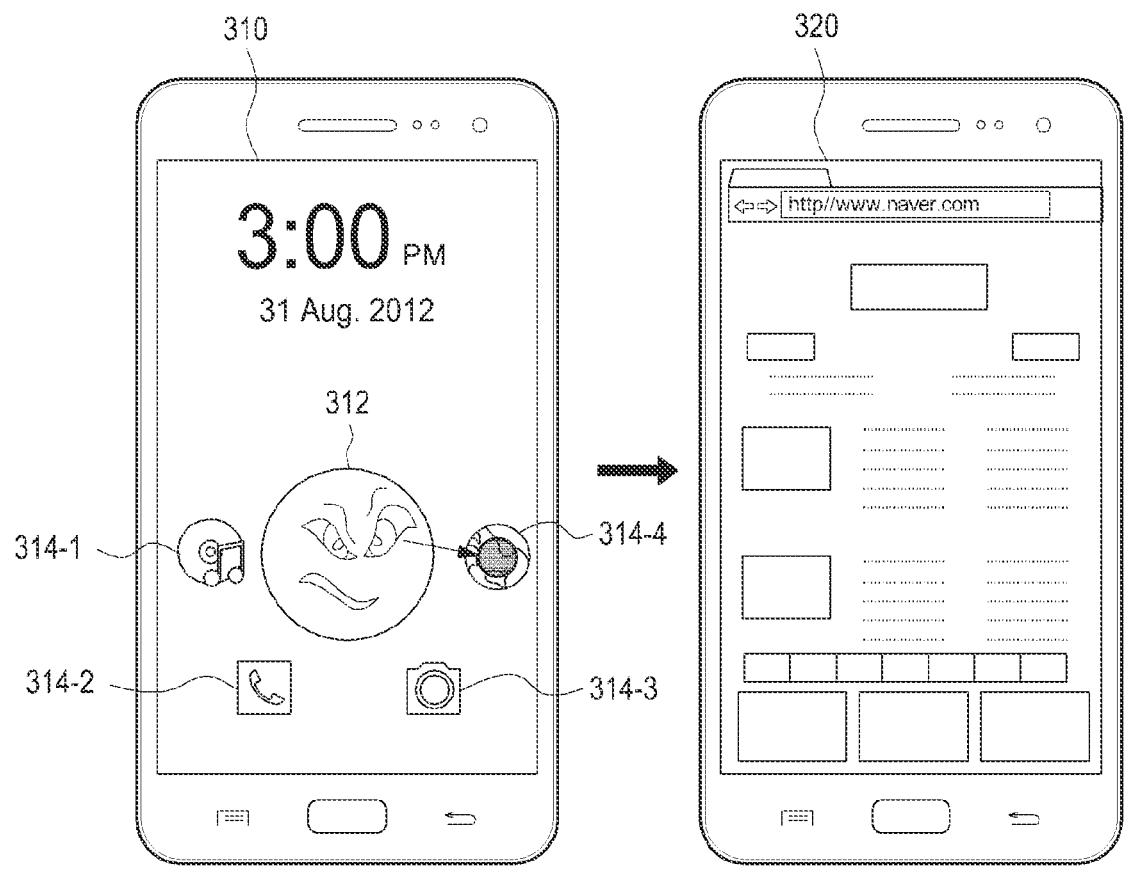
FIGS. 3A and 3B are diagrams illustrating an example of a screen when an unlocking operation is performed in an electronic device according to an embodiment of the present invention.

FIG. 2 is a flowchart illustrating an unlocking operation in the electronic device 100 according to an embodiment of the present invention. FIGS. 3A and 3B are diagrams illustrating an example of a screen when an unlocking operation is performed in the electronic device 100 according an embodiment of the present invention.

Referring to FIGS. 2, 3A and 3B, the electronic device 100 may be in a lock mode in step 202. The electronic device 100 displays a lock screen and at least one function icon in the lock mode. For example, the electronic device 100 may display a lock screen 310 and at least one icon 314-1 through 314-4 representing a function or an application in a lock mode, as shown in FIG. 3A. The at least one icon may include, for example, a music play application icon 314-1, a call function icon 314-2, a camera function icon 314-3, and an Internet browser icon 314-4. In addition to the icons, icons for other functions or applications may be included.

The electronic device 100 determines whether a request for unlocking exists in step 204. A user may request the cancellation of a lock mode by pressing a predetermined unlock request button in the lock mode or inputting a predetermined user gesture input into the lock screen.

The electronic device 100 extracts a facial region in operation 206 when the request for canceling the lock mode is input. That is, the electronic device 100 captures an image using one of the first camera 151 and the second camera 152, and extracts the facial region from the captured image.

When the facial region is extracted, the electronic device 100 proceeds with a facial recognition process 210 corresponding to steps 212 through 216, and proceeds with a gaze recognition process 220 corresponding to steps 222 through 226.

In the facial recognition process 210, the electronic device 100 extracts component information associated with the facial region in step 212. For example, the electronic device 100 extracts, from the facial region, facial component information such as a symmetric composition, a shape, hair, a color of eyes, muscles of a face, and the like.

In step 214, the electronic device 100 compares the extracted facial component information to a face registered in advance. In this scenario, the registered face may be facial component information associated with a facial region stored in advance by the user after capturing a user's face.

In step 216, the electronic device 100 determines whether the facial region is identical to the registered face. When the facial region is identical to the registered face, the electronic device 100 proceeds to step 230.

In the gaze recognition process 220, the electronic device 100 extracts an eye region from the extracted facial region in step 222. In step 224, the electronic device 100 recognizes a gaze by analyzing a pupil and a reflected light in the extracted eye region, and determines a point at which the recognized gaze is aimed. In this example, the electronic device 100 may display a gaze image 312 to represent the recognized gaze, as shown in the FIG. 3A.

The electronic device 100 temporarily stores a function placed on the point at which the gaze is aimed in step 226. For example, when the recognized gaze is aimed at the Internet browser icon 314-4 as shown in the FIG. 3A, the electronic device 100 selects an Internet browser function, and temporarily stores the selected function. The electronic device 100 may select a function placed on the point at which the recognized gaze is aimed at, and temporarily stores the selected function, and proceeds to step 230.

After performing the facial recognition process 210 and the gaze recognition process 220 as described above, the electronic device 100 performs unlocking based on a result of the facial recognition process 210 indicating that faces are identical, and simultaneously, executes the function selected as a result of the gaze recognition process 220.

For example, when the facial recognition shows that the recognized face is identical to the registered face and an internet browser function (or application) is selected through the gaze recognition, the electronic device 100 performs unlocking and simultaneously executes the Internet browser function, and displays an Internet browser screen 320, as shown in the FIG. 3B.

Although the embodiment of the present invention selects a function to be executed through gaze recognition, the function may be selected by any user gesture input, for example, a touch input or a touch and drag input.

Figure 4:
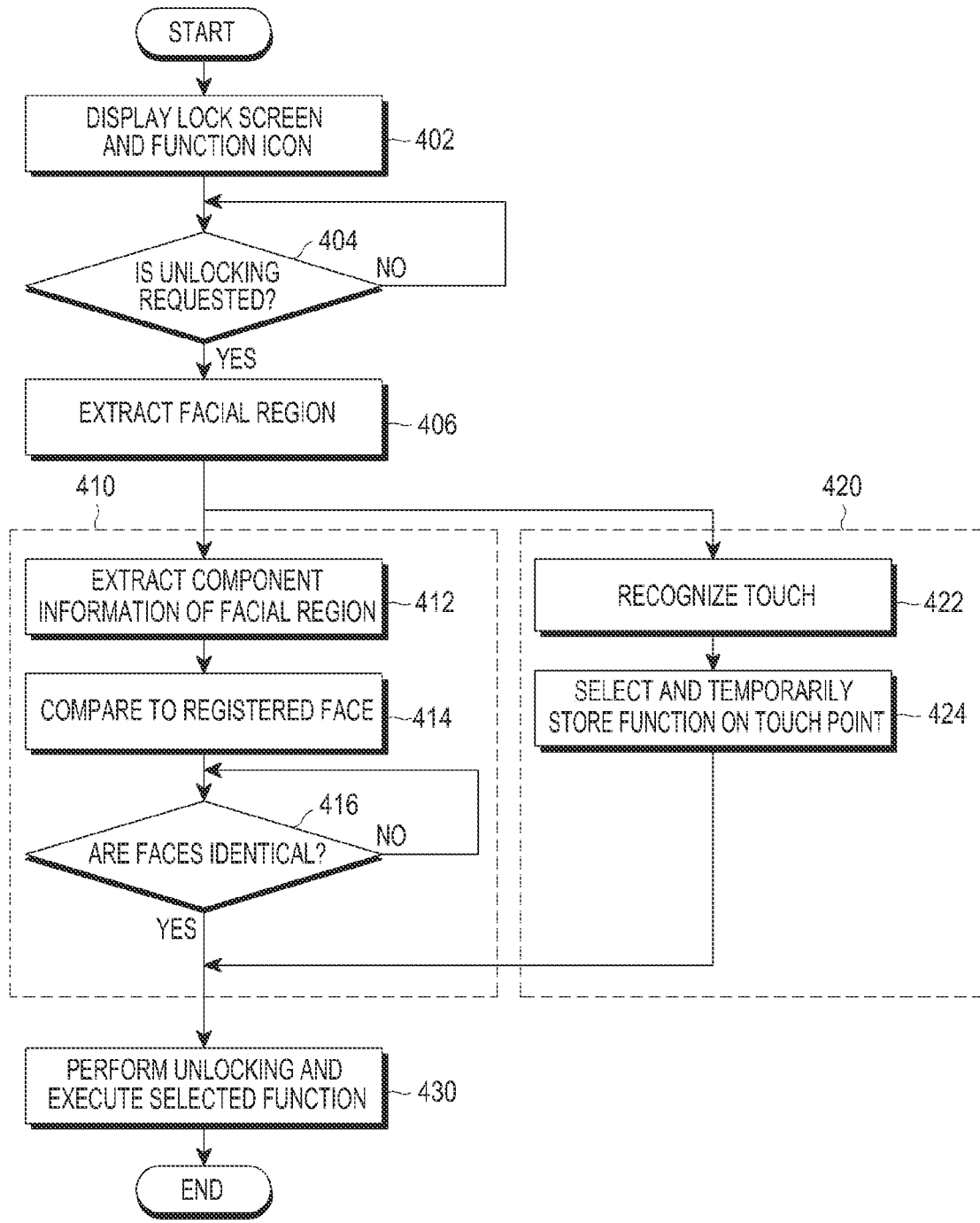
FIG. 4 is a flowchart illustrating an unlocking operation in an electronic device according to an embodiment of the present invention.
Figures 5A, 5B:
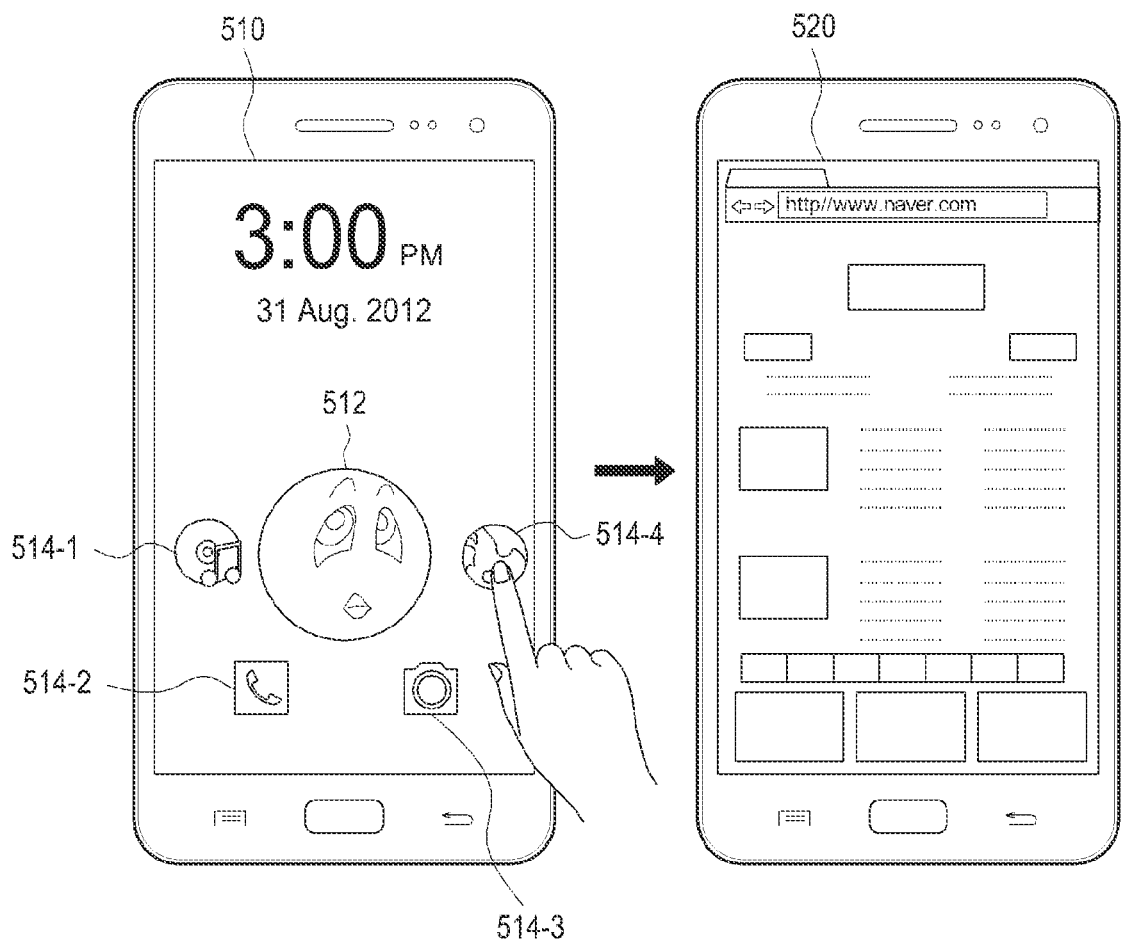
FIGS. 5A and 5B are diagrams illustrating an example of a screen when an unlocking operation is performed in an electronic device according to an embodiment of the present invention.

FIG. 4 is a flowchart illustrating an unlocking operation in the electronic device 100 according to an embodiment of the present invention. FIGS. 5A and 5B are diagrams illustrating an example of a screen when an unlocking operation is performed in the electronic device 100 according to an embodiment of the present invention.

Referring to FIGS. 4, 5A and 5B, the electronic device 100 may be in a lock mode in step 402. The electronic device 100 displays a lock screen and at least one function icon in the lock mode. For example, the electronic device 100 may display a lock screen 510 and at least one icon 514-1 through 514-4 indicating a function or an application in the lock mode, as shown in the FIG. 5A. The at least one icon may include, for example, a music play application icon 514-1, a call function icon 514-2, a camera function icon 514-3, and an Internet browser icon 514-4. In addition to the icons mentioned above, icons for other functions or applications may be included.

In step 404, the electronic device 100 determines whether a request for unlocking has been made. A user may request cancellation of the lock mode by pressing a predetermined unlocking request button or inputting, into the lock screen, a predetermined user gesture input such as, for example, a touch input or a touch & hold input.

When the request for canceling the lock mode is input, the electronic device 100 extracts a facial region in step 406. That is, the electronic device 100 captures an image using one of the first camera 151 and the second camera 152, and extracts a facial region from the captured image.

When the facial region is extracted, the electronic device 100 performs a facial recognition process 410 corresponding to steps 412 through 416 and a touch recognition process 420 corresponding to steps 422 through 424.

In the facial recognition process 410, the electronic device 100 extracts component information associated with the facial region in step 412. For example, the electronic device 100 extracts, from the facial region, facial component information such as a symmetric composition, a shape, hair, a color of eyes, muscles of a face, and the like.

In step 414, the electronic device 100 compares the extracted facial component information to a face registered in advance. In this example, the registered face may be facial component information associated with a facial region stored in advance by the user after capturing a user's face In step 416, the electronic device 100 determines whether the facial region is identical to the registered face. When the facial region is identical to the registered face, the electronic device 100 proceeds to step 430.

In the touch recognition process 420, the electronic device 100 recognizes a touch of the user on the touch screen 190 in step 422. In this scenario, various user gestures may be recognized in addition to a touch. The electronic device 100 may display a touch point recognition image 512 to represent the recognized touch point as shown in the FIG. 5A.

In step 424, the electronic device 100 temporarily stores a function placed on the touch point. For example, when the touch point corresponds to the Internet browser icon 514-4 as shown in the FIG. 5A, the electronic device 100 selects an Internet browser function, and temporarily stores the selected function. The electronic device 100 may select a function placed at the touch point, temporarily stores the selected function, and proceeds to step 430.

After performing the facial recognition process 410 and the touch recognition process 420 as described above, the electronic device 100 performs unlocking based on a result of the facial recognition process 410 indicating that faces are identical, and simultaneously, executes the function selected as a result of the touch recognition process 420.

For example, when the facial recognition shows that the recognized face is identical to the registered face and an internet browser function is selected through the touch recognition, the electronic device 100 executes the Internet browser function at the same time as unlocking, and displays an Internet browser screen 520, as shown in the FIG. 5B.

According to an embodiment of the present invention, unlocking may be performed based on another unlocking scheme when the recognized face and the registered face are not identical.

Figure 6:
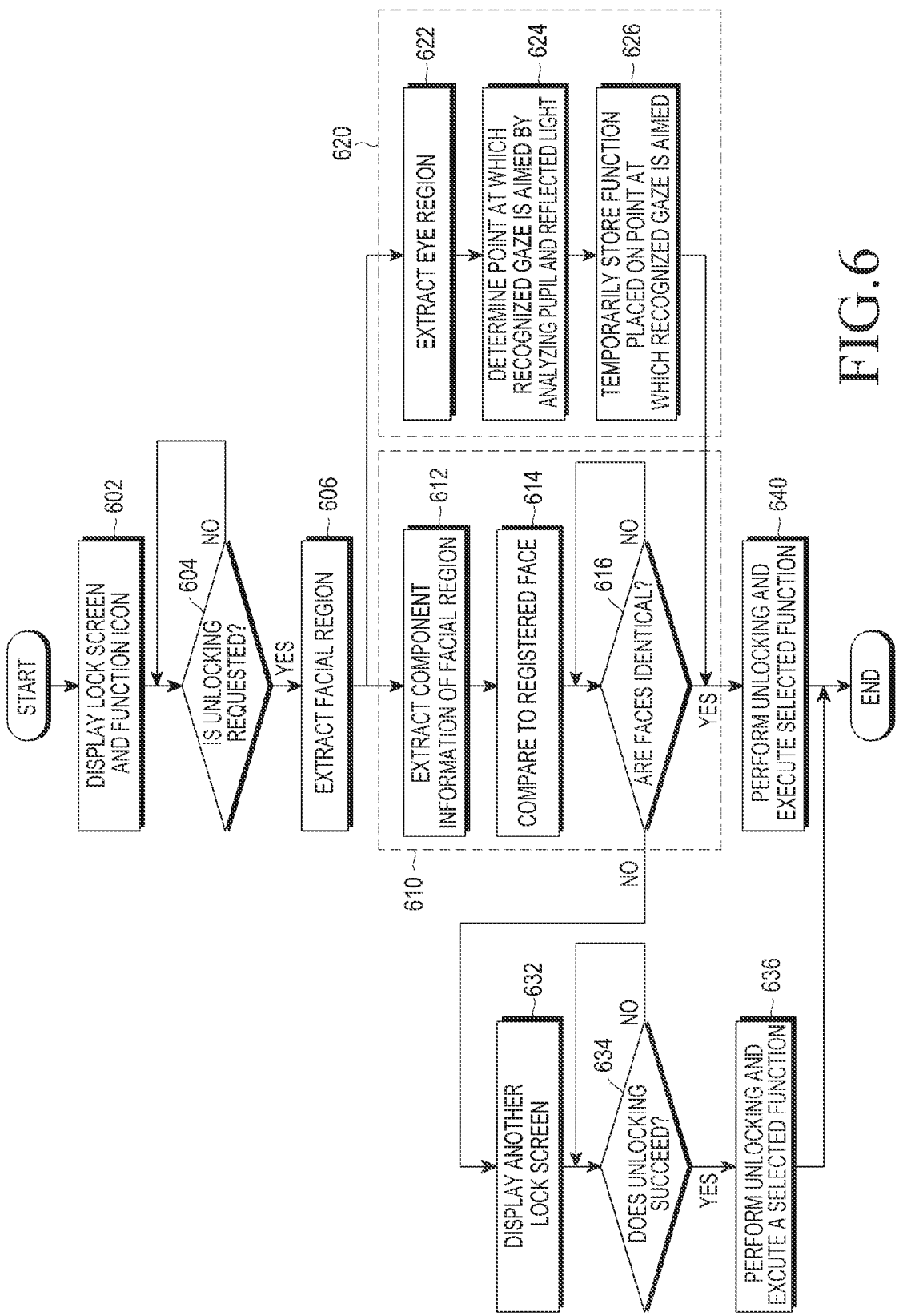
FIG. 6 is a flowchart illustrating an unlocking operation in an electronic device according to an embodiment of the present invention.
Figure 7A:
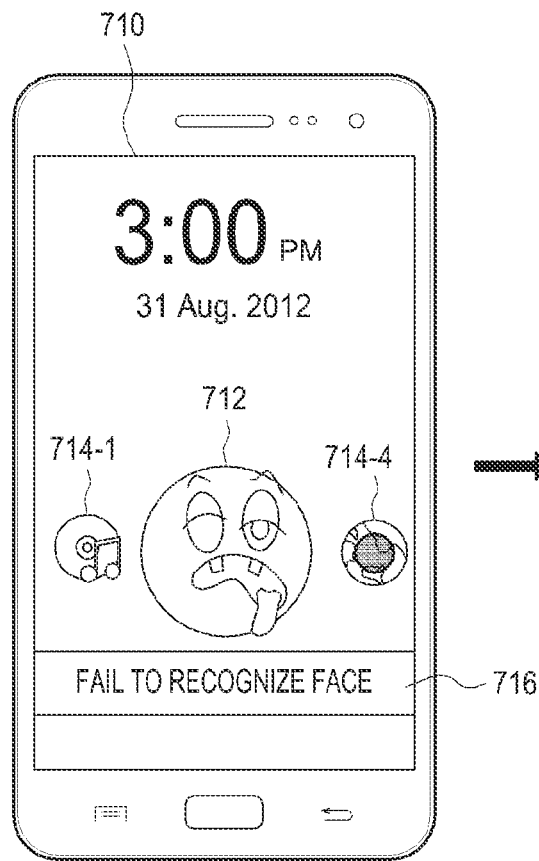
FIGS. 7A and 7B are diagrams illustrating an example of a screen when an unlocking operation is performed in an electronic device according to an embodiment of the present invention.
Figure 7B:
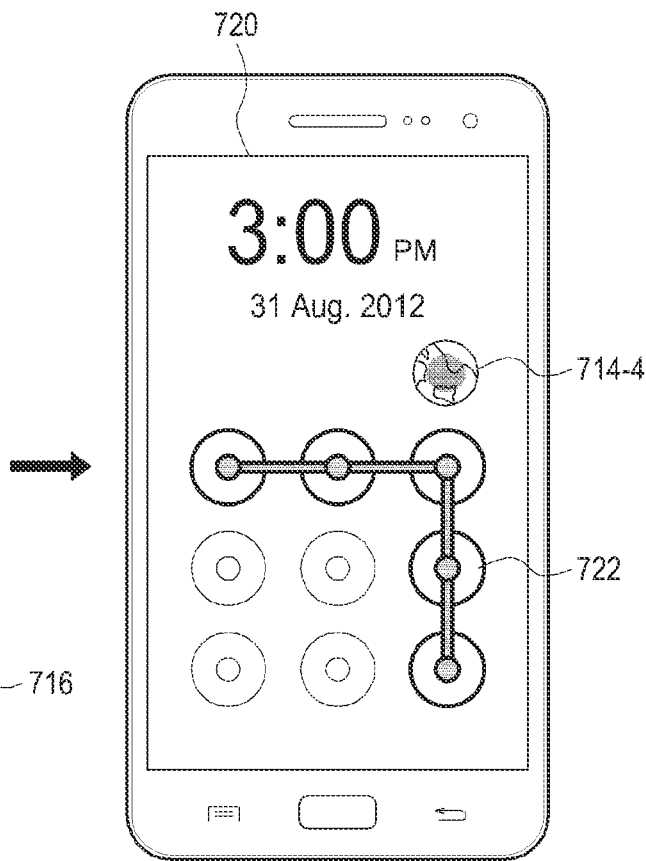

FIG. 6 is a flowchart illustrating an unlocking operation in an electronic device according to the an embodiment of the present invention. FIGS. 7A and 7B are diagrams illustrating an example of a screen when an unlocking operation is performed in an electronic device according to an embodiment of the present invention.

Referring to FIGS. 6, 7A and 7B, the electronic device 100 may be in a lock mode in step 602. The electronic device 100 displays a lock screen and at least one function icon in the lock mode. For example, the electronic device 100 may display a lock screen 710 and at least one icon 714-1 and 714-4 indicating a function or an application in the lock mode, as shown in FIG. 7A. The at least one icon may include, for example, a music play application icon 714-1 and an Internet browser icon 714-4. In addition to the icons mentioned above, icons for other functions or applications may be included.

In step 604, the electronic device 100 determines whether a request for unlocking has been made. A user may request canceling the lock mode by pressing a predetermined unlocking request button or inputting, into the lock screen, a predetermined user gesture input such as, for example, a touch input or a touch & hold input.

When the request for canceling the lock mode is input, the electronic device 100 extracts a facial region in step 606. That is, the electronic device 100 captures an image using one of the first camera 151 and the second camera 152, and extracts the facial region from the captured image.

When the facial region is extracted, the electronic device 100 performs a facial recognition process 610 corresponding to steps 612 through 616 and a gaze recognition process 620 corresponding to steps 622 through 626. In this scenario, a touch recognition process may be performed instead of the gaze recognition process.

In the facial recognition process 610, the electronic device 100 extracts component information associated with the facial region in step 612. For example, the electronic device 100 extracts, from the facial region, facial component information such as a symmetric composition, a shape, hair, a color of eyes, muscles of a face, and the like.

In step 614, the electronic device 100 compares the extracted facial component information to a face registered in advance. In this scenario, the registered face may be facial component information associated with a facial region stored in advance by the user after capturing a user's face.

In step 616, the electronic device 100 determines whether the facial region is identical to the registered face. When the facial region is identical to the registered face, the electronic device 100 proceeds to step 630.

In the gaze recognition process 620, the electronic device 100 extracts an eye region from the extracted facial region in step 622. The electronic device 100 recognizes a gaze by analyzing a pupil and a reflected light in the extracted eye region, and determines a point at which the recognized gaze is aimed in step 624. In step 626, the electronic device 100 temporarily stores a function placed at the point at which the gaze is aimed.

When facial recognition succeeds and the function indicated by the recognized gaze is stored after performing the facial recognition process 610 and the gaze recognition process 620, the electronic device 100 performs unlocking, and simultaneously, executes the function placed at the point at which the gaze is aimed.

However, when it is determined, in step 616, that the facial region and the registered face are not identical, the electronic device 100 displays a facial recognition failure image 712 and a message 716 indicating that facial recognition is impossible as shown in FIG. 7A. Accordingly, the device 100 proceeds to step 632.

In step 632, the electronic device 100 displays another lock screen that is different from an initially displayed facial recognition-based lock screen 710, such as, for example, a pattern recognition lock screen 720, as shown in FIG. 7B. In this scenario, an icon 714-4 associated with a previously selected function may also be displayed on the pattern recognition lock screen 720.

In step 634, the electronic device 100 determines whether unlocking through the other lock screen succeeds. For example, in the case of the pattern recognition lock screen 720 shown in FIG. 7B, the electronic device 100 determines whether pattern recognition performed by inputting a predetermined pattern 722 for unlocking succeeds.

When unlocking succeeds, the electronic device 100 performs unlocking and executes the selected function in step 636. Alternatively, if a function is not selected due to the failure of the gaze recognition and the like, only unlocking may be performed.

According to various embodiments of the present invention as described in the foregoing description, a user may simultaneously and quickly request execution of a desired function or application in an electronic device, before canceling a lock mode. As a result, the function or application requested by the user may be executed at the same time as unlocking. Also, according to various embodiments of the present invention, unlocking and execution of a function or application may be more promptly performed by simultaneously performing unlocking through facial recognition and execution of the function or application through gaze recognition. Also, according to various embodiments of the present invention, unlocking may be performed through another predetermined unlocking scheme when facial recognition fails, thereby increasing the convenience for a user.

The methods according to embodiments of the present invention may be executed in a program command form that can be executed through various computer means, and be recorded in a computer-readable recording medium. The computer-readable recoding medium may contain program commands, data files, data structures or the like individually or in combination. The program commands recorded in the medium may be those specially designed for the present invention or those publicly known and used by a person skilled in the art of computer software.

The unlocking method according to the above-described embodiments of the invention may be embodied as hardware, software or a combination of hardware and software. Software may be stored in a volatile or non-volatile storage device such as read only memory (ROM) and the like irrespective of erasing or rewriting, a memory such as a random access memory (RAM), a memory chip, a device, and a integrated circuit, or a storage medium that is capable of performing optical or magnetic recording and machine-reading (for example, a computer) such as compact disc (CD), digital versatile disc (DVD), optical disc, magnetic tape, and the like. The unlocking method of the present invention may be embodied by a computer or an electronic device including a controller and a memory. The memory may be an example of machine-readable storage media that are suitable for storing a program including instructions to implement the embodiments, or programs. Therefore, the invention may include a program including a code to implement an apparatus or a method as claimed herein, and a machine-readable storage medium including the program, for example, a computer-readable storage medium. The program may be transferred electronically through a medium such as a communication signal transferred through a wired or wireless connection, and the invention may appropriately include an equivalent medium.

Also, the electronic device may receive a program from a program providing device that is a wiredly or wirelessly connected to the electronic device, and may store the program. The program providing device may include a memory storing a program including instructions to instruct performing of the unlocking method, a communication unit to perform wired or wireless communication with the electronic device, and a controller to transmit the program through the communication unit, automatically or in response to the request from the electronic device.

While the present invention has been shown and described with reference to certain embodiments thereof, it will be understood by those skilled in the art that various changes in form and details may be made without departing from the spirit and scope of the present invention as defined by the appended claims.

What is claimed is:

1. An electronic device, comprising:
a display unit;
at least one camera; and
a controller configured to:
 display, on the display unit, at least one function icon on a lock screen in a locked state,
 in response to a request for unlocking, extract a facial region based on data received from the at least one camera in the locked state,
 recognize a face of a registered user based on the facial region and recognize a gaze of eyes based on the facial region in the locked state,
 select a function icon to be executed from among the displayed at least one function icon, wherein the selected function icon is displayed on a point of the lock screen aimed at by on the recognized gaze,
 if the face of the registered user is recognized in the extracted facial region and the gaze of eyes is not recognized, perform unlocking, and
 if the face of the registered user is recognized in the extracted facial region and the gaze of eyes is recognized, execute an application corresponding to the selected function icon simultaneously with the unlocking.

2. The device of claim 1, wherein the controller displays a second lock screen when the facial recognition fails, and proceeds with the unlocking through the second lock screen, wherein the selected function icon is displayed on the second lock screen.

3. The device of claim 2, wherein the second lock screen includes a pattern recognition lock screen.

4. The device of claim 1, wherein the controller further configured to:
display an image representing the recognized gaze of eyes on the lock screen.

5. A method of unlocking in an electronic device, the method comprising:
displaying at least one function icon on a lock screen in a locked state;
in response to a request for unlocking, extracting a facial region based on data received from at least one camera in a locked state;
recognizing a face of a registered user based on the facial region and recognizing a gaze of eyes based on the facial region in the locked state;
selecting a function icon to be executed from among the displayed at least one function icon, wherein the selected function icon is displayed on a point of the lock screen aimed at by the recognized gaze;
if the face of the registered user is recognized in the extracted facial region and the gaze of eyes is not recognized, performing unlocking; and
if the face of the registered user is recognized in the extracted facial region and the gaze of eyes is recognized, executing a function corresponding to the selected function icon simultaneously with the unlocking.

6. The method of claim 5, wherein, when the facial recognition fails, the method further comprises:
displaying a second lock screen and proceeding with unlocking through the second lock screen, wherein the selected function icon is displayed on the second lock screen.

7. The method of claim 6, wherein the second lock screen includes a pattern recognition lock screen.

8. The method of claim 5, further comprising:
displaying an image representing the recognized gaze of eyes on the lock screen.

9. A non-transitory computer-readable storage medium that stores an unlocking program, wherein the program in an electronic device performs a method including the steps of:
displaying at least one function icon on a lock screen in a locked state;
in response to a request for unlocking, extracting a facial region based on data received from at least one camera in the locked state;
recognizing a face of a registered user based on the facial region and recognizing a gaze of eyes based on the facial region in the locked state;
selecting a function icon to be executed from among the displayed at least one function icon based on the identified gaze, wherein the selected function icon is displayed on point of the lock screen aimed at by the recognized gaze;
if the face of the registered user is recognized in the extracted facial region and the gaze of eyes is not recognized, performing unlocking; and
if the face of the registered user is recognized in the extracted facial region and the gaze of eyes is recognized, and executing a function corresponding to the selected function icon simultaneously with the unlocking.

* * * * *